(12) United States Patent
Pieszka-Lyson et al.

(10) Patent No.: US 11,923,113 B2
(45) Date of Patent: Mar. 5, 2024

(54) POWER CABLE ASSEMBLY FOR A POWER DISTRIBUTION SYSTEM HAVING AN INTEGRATED COOLING SYSTEM

(71) Applicant: Aptiv Technologies AG, Schaffhausen (CH)

(72) Inventors: Monika Pieszka-Lyson, Cracow (PL); Dominik Kawalec, Brzoskwinia (PL); Pawel Kozak, Cracow (PL); Grzegorz Porebski, Podłęże (PL); Grzegorz Paletko, Zabierzów (PL); Rafal Architekt, Pacanow (PL)

(73) Assignee: Aptiv Technologies AG, Schaffhausen (CH)

( * ) Notice: Subject to any disclaimer, the term of this patent is extended or adjusted under 35 U.S.C. 154(b) by 0 days.

(21) Appl. No.: 17/949,347

(22) Filed: Sep. 21, 2022

(65) Prior Publication Data

US 2023/0103931 A1    Apr. 6, 2023

(30) Foreign Application Priority Data

Oct. 1, 2021 (EP) .................................... 21200425

(51) Int. Cl.
  *H01B 7/42* (2006.01)
  *B60L 53/18* (2019.01)
  *H01B 9/00* (2006.01)

(52) U.S. Cl.
  CPC .............. *H01B 7/423* (2013.01); *H01B 9/006* (2013.01)

(58) Field of Classification Search
  CPC .......... H01B 7/423; H01B 9/006; B60L 53/18
  See application file for complete search history.

(56) References Cited

U.S. PATENT DOCUMENTS

| 4,043,031 A | * | 8/1977 | Friedrich | ............... | H02G 15/28 |
| | | | | | 228/187 |
| 5,591,937 A | | 1/1997 | Woody et al. | | |

(Continued)

FOREIGN PATENT DOCUMENTS

| CN | 108597654 A | 9/2018 |
| CN | 208753040 U | 4/2019 |

(Continued)

OTHER PUBLICATIONS

Extended Search Report for Application No. 21200425.3-1201; dated Mar. 18, 2022, 8 pages.

*Primary Examiner* — Hoa C Nguyen
*Assistant Examiner* — Amol H Patel
(74) *Attorney, Agent, or Firm* — Billion & Armitage

(57) ABSTRACT

A power cable assembly includes a power cable core. The power cable core has a longitudinally extending cooling tube comprising a thermally conductive wall defining an interior channel for circulating, between a coolant inlet and a coolant outlet of the cooling tube, a coolant medium; a longitudinally extending electrical conductor configured to be coupled via first and second connectors to respective electrical connections of a power distribution system; and a first insulating layer surrounding the power cable core. The electrical conductor is arranged to surround the cooling tube at least partially such that at least a portion of an external surface of the thermally conductive wall is provided in direct contact with a corresponding portion of the electrical conductor over a heat exchange region so as to transfer heat from the electrical conductor to the coolant medium circulating in the interior channel of the cooling tube.

14 Claims, 14 Drawing Sheets

(56) References Cited

U.S. PATENT DOCUMENTS

| | | | |
|---|---|---|---|
| 2003/0164245 A1 | 9/2003 | Areskoug | |
| 2018/0304753 A1* | 10/2018 | Vondrell | ................ B64D 27/24 |
| 2020/0282851 A1 | 9/2020 | Sasaridis et al. | |
| 2021/0267097 A1* | 8/2021 | Coppola | ............ H05K 7/20872 |

FOREIGN PATENT DOCUMENTS

| | | |
|---|---|---|
| CN | 111048247 A | 4/2020 |
| CN | 210295942 U | 4/2020 |
| CN | 110911043 B | 6/2021 |
| WO | 2009134379 A1 | 11/2009 |

* cited by examiner

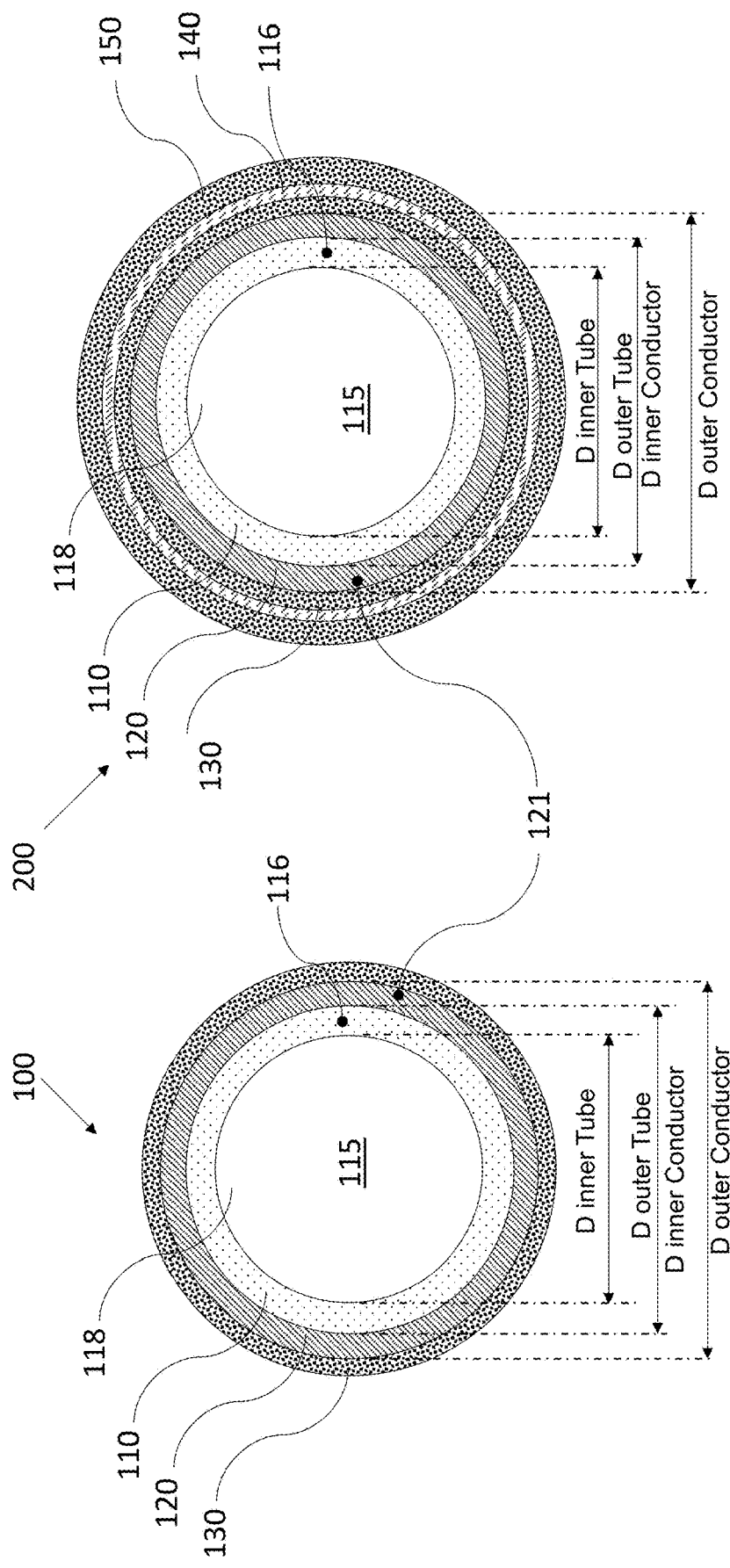

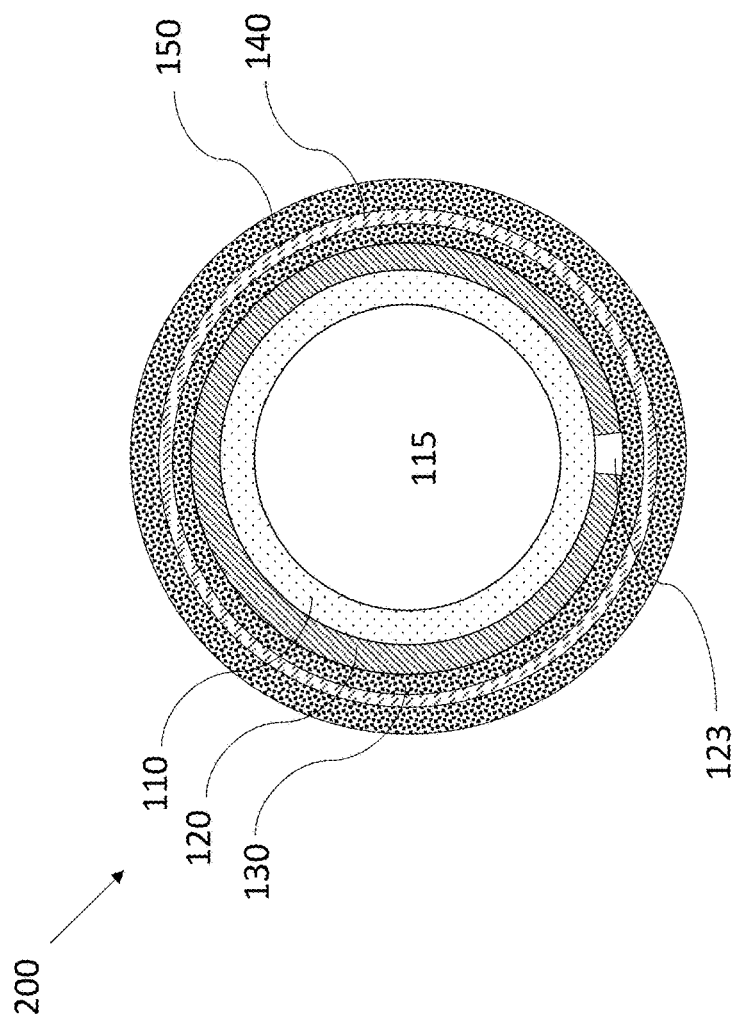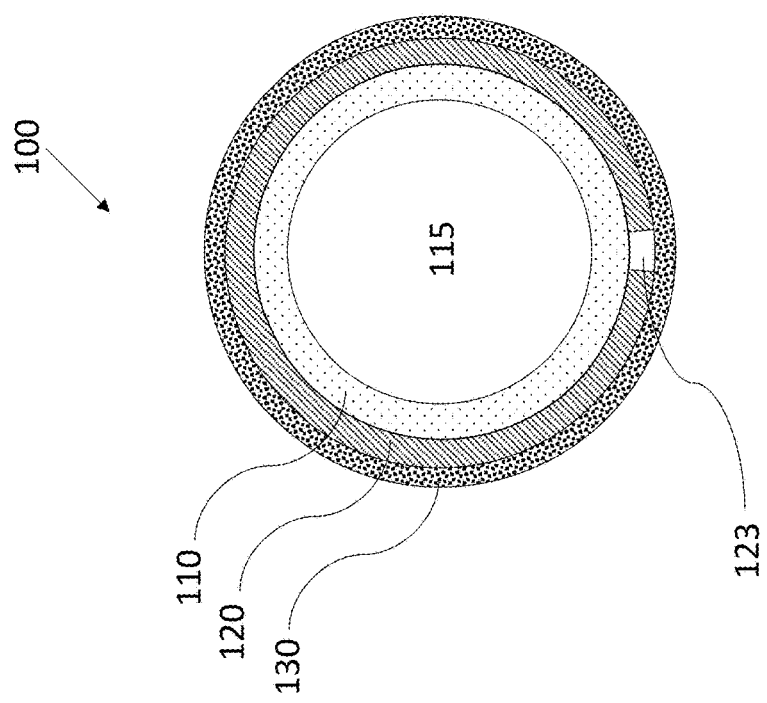

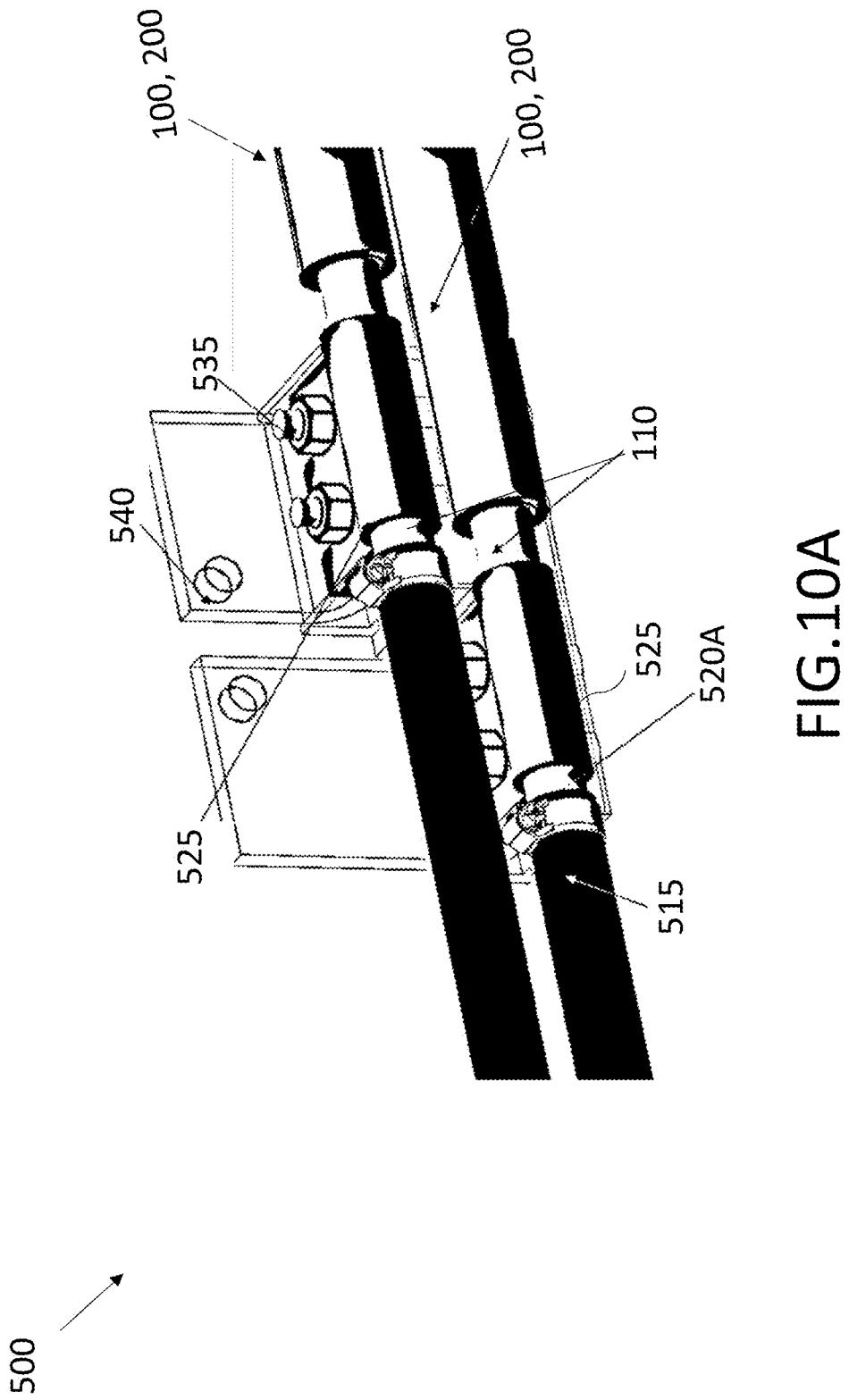

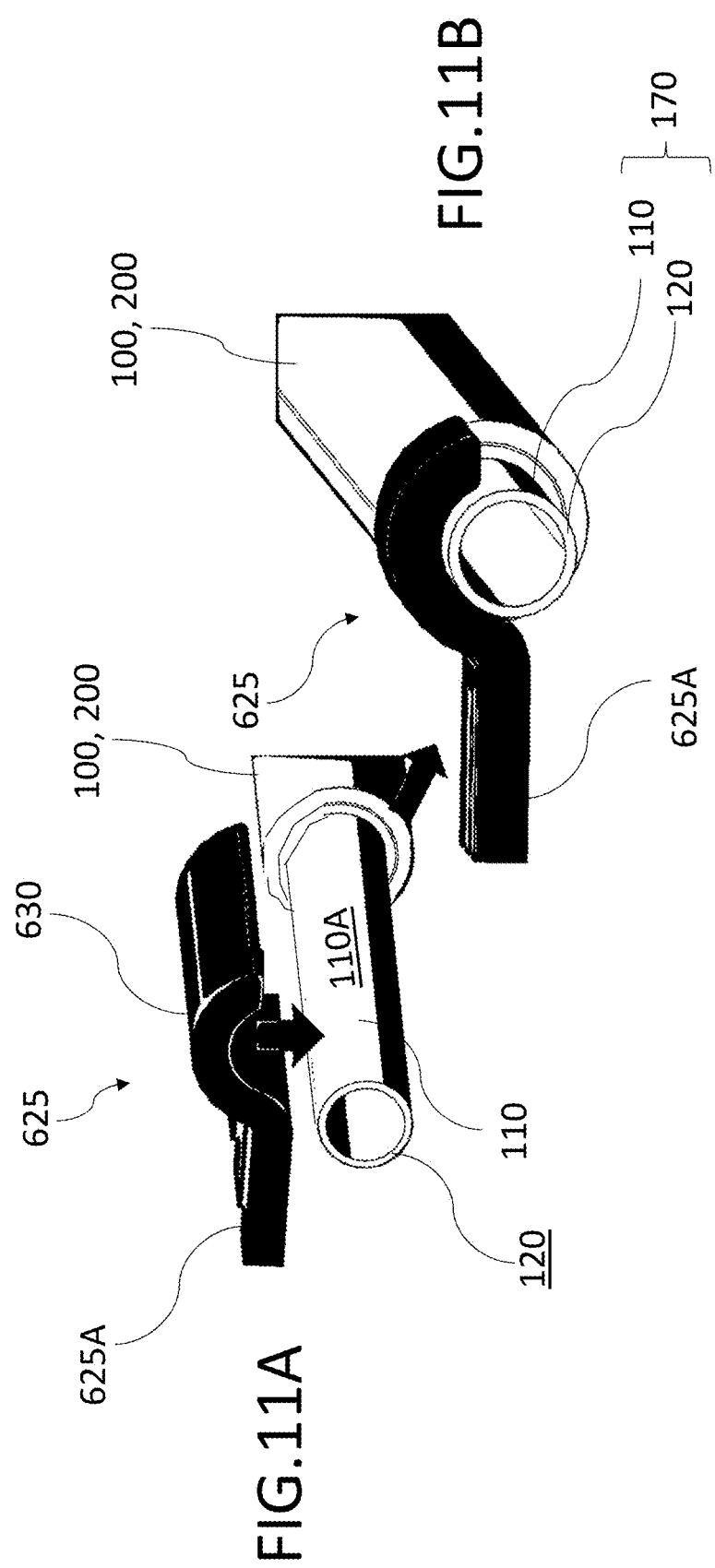

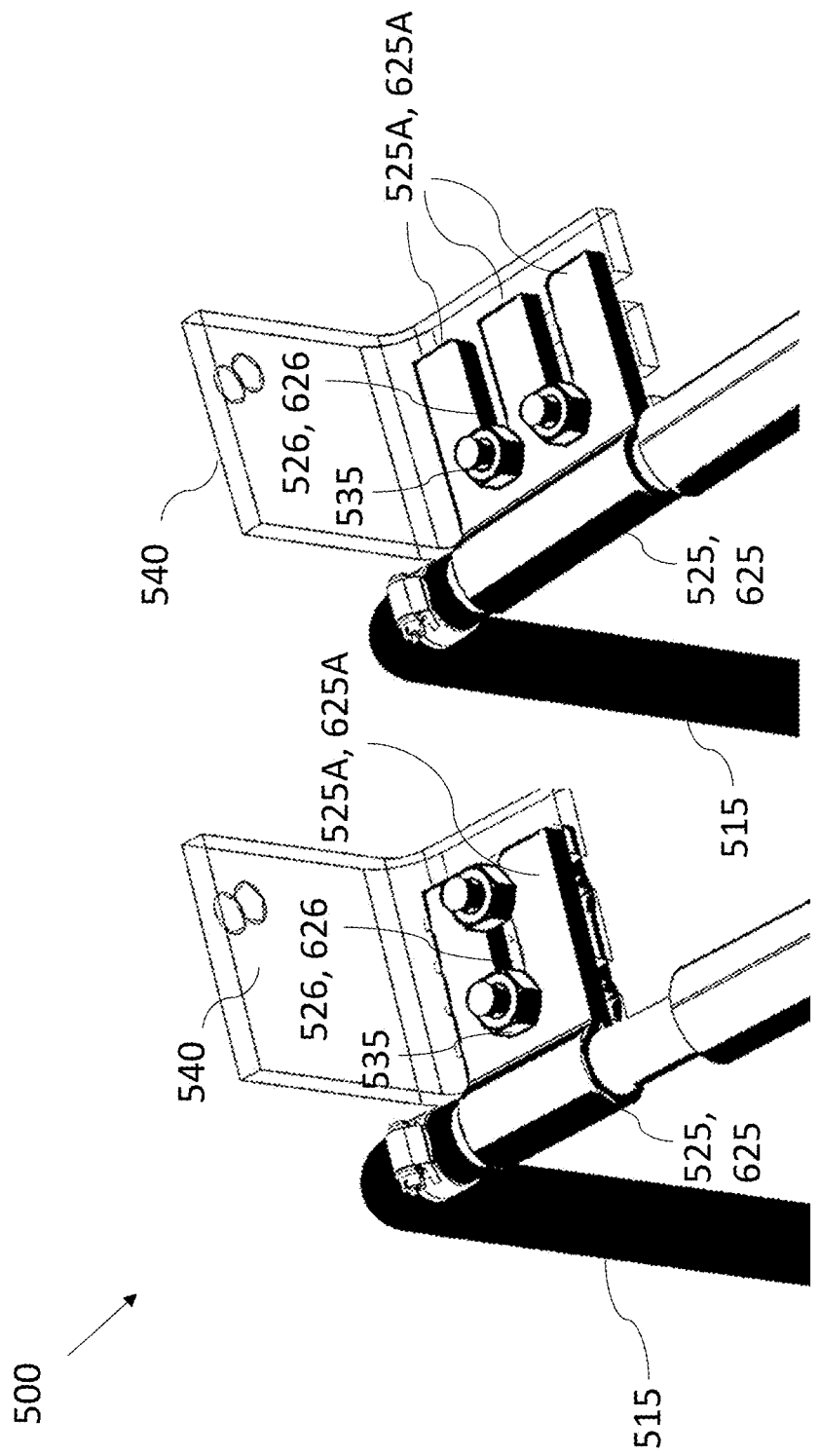

POWER CABLE ASSEMBLY FOR A POWER DISTRIBUTION SYSTEM HAVING AN INTEGRATED COOLING SYSTEM

CROSS-REFERENCE TO RELATED APPLICATION

This application claims benefit of priority to European Patent Application No. 21200425.3 filed on Oct. 1, 2021, the entire disclosure of which is hereby incorporated by reference.

TECHNICAL FIELD OF THE INVENTION

The present application relates in general to a power cable assembly, and more particularly, to a high voltage power cable assembly for a power distribution system incorporating an integrated coiling system.

BACKGROUND

Charging of high voltage batteries, for example, in the field of automotive technology, requires the use of heavy gauge high voltage (HV) power cables that can handle the level of current required to ensure fast charging. The HV power cables used in battery charging applications and/or power distribution applications are usually provided with a cooling system to ensure that the heat generated at the electrical conductor due to the high current flow is dissipated away, thereby increasing the efficiency and safety of the charging operation.

In one existing approach of the prior art, passive cooling solutions may be applied to reduce the temperature dissipated by an HV power cable. However, passive cooling solutions are limited due to manufacturing and weight constraints. For example, changing the dimensions of the components, e.g., increase the electrical conductor gauges to reduce temperature, would increase the weight and cost of the power cable assembly while reducing its flexibility.

Examples of known cable cooling systems are described in KR102120306 and WO201860151. Typically, known power cable assemblies use one or more busbars to carry the electrical power and large heat sinks or air-cooling units that are designed to dissipate the heat generated during operation at the busbar.

Therefore, there is a need to provide a power cable assembly with an improved cooling system that addresses the above noted problems.

SUMMARY

It is an aim of the present disclosure to provide an improved power cable assembly and an improved power distribution system that addresses the problems described above.

According to an aspect of the present disclosure, a power cable assembly includes a power cable core having a longitudinally extending cooling tube including a thermally conductive wall defining an interior channel for circulating, between a coolant inlet and a coolant outlet of the cooling tube, a coolant medium, a longitudinally electrical conductor extending configured to be coupled via first and second connectors to respective electrical connections of a power distribution system, and a first insulating layer surrounding the power cable core. The electrical conductor is arranged to surround the cooling tube at least partially such that at least a portion of an external surface of the thermally conductive wall is provided in direct contact with a corresponding portion of the electrical conductor over a heat exchange region so as to transfer heat from the electrical conductor to the coolant medium circulating in the interior channel of the cooling tube. The cooling tube of the power cable assembly is provided at least partially surrounded by an electrical conductor, which may be extruded or wrapped around the cooling tube. For example, the electrical conductor may be in the form of a busbar, which may be wrapped around the colling tube. As a result, portions of the external surface of the thermally conductive wall of the cooling tube are provided in direct contact with corresponding portions of the electrical conductor, thereby defining a heat transfer region where heat generated at the electrically conductor is transferred via the thermally conductive wall to the coolant medium circulated in the cooling tube. The proposed arrangement of the cooling tube offers the advantage of improved heat dissipation using a single central cooling tube, thereby reducing the manufacturing cost and the weight of the power cable assembly. It should be noted that the power cable assembly may be provided with one or more centrally located cooling tubes surrounded by the electrical conductor.

According to embodiments of the present disclosure, the electrical conductor is configured to completely surround the cooling tube.

According to embodiments of the present disclosure, the electrical conductor is extruded over the cooling tube.

According to embodiments of the present disclosure, the electrical conductor is in the form of a busbar configured to be wrapped around the cooling tube.

According to embodiments of the present disclosure, the electrical conductor is made of a metal or a metal alloy material. For example, the electrical conductor may include one or more of the following: (i) copper, copper ETP, and/or a copper alloy; (ii) aluminium, and/or an aluminium alloy. Other suitable material, with high electrical conductivity may also be used for the electrical conductor.

According to embodiments of the present disclosure, the cooling tube is made from a polymer material.

According to embodiments of the present disclosure, the thickness of the thermally conductive wall of the cooling tube is between 0.5 mm and 2.0 mm. The thickness of the thermally conductive wall may be adjusted to achieve the required heat dissipation while maintain the robustness and flexibility of the power cable assembly.

According to embodiments of the present disclosure, the cooling tube has a tubular or cylindrical form. It should be noted that the cooling tube and/or the power cable assembly may be provided in other desired forms such as rectangular, square, and the like.

According to embodiments of the present disclosure, the power cable assembly further including: (i) a shielding layer surrounding the first insulating layer; and (ii) a second insulating layer external to the shielding layer.

According to a second aspect of the present disclosure, a cooling system is provided, for coupling to a power cable assembly according to embodiments of the first aspect for circulating a coolant medium between a coolant inlet and a coolant outlet, via the interior channel of the cooling tube. The cooling system includes a circulation pump for circulating the coolant medium between the coolant inlet and the coolant outlet, a cooling unit, and one or more coolant medium connectors for connecting the coolant inlet and the coolant outlet to the cooling system. The coolant medium is circulated, via the cooling system, through the interior channel of the cooling tube between the coolant inlet and the coolant outlet. The coolant inlet and the coolant outlet are connected, via one or more coolant medium connectors, to a cooling system provided in fluid communication with the power cable assembly. The cooling system is provided as a closed-loop coolant circulation system. The cooling unit is configured to extract the heat from the coolant medium exiting the coolant outlet.

According to embodiments of the present disclosure, the coolant medium is a water-based fluid or a dielectric coolant. Since coolant tube is made from an electrically insulated material, different types of coolant mediums may be used, such as non-dielectric coolant mediums. For example, the coolant medium provided in the coolant tube may be a water-based coolant such as water and glycol mixture. Equally, the coolant medium may be a dielectric coolant such as oil-based fluid or another suitable dielectric coolant.

According to embodiments of the present disclosure, the coolant inlet and coolant outlet are arranged at opposite ends of the electrical conductor or at the same end of the power cable assembly.

According to a third aspect of the present disclosure, a power distribution system is provided that includes a power cable assembly according to embodiments of the first aspect; and an integrated cooling system according to embodiments of the second aspect, coupled to the power cable assembly, for circulating the coolant medium between the coolant inlet and coolant outlet of the interior channel of the cooling tube.

According to embodiments of the present disclosure, the first and second electrical connectors each include a connector body having a connector portion adapted to contact an end contact surface of the electrical conductor and a coupling portion adapted for an electrical connection to a respective electrical connection of the power distribution system. To ensure that the power cable can be integrated into a system such as a vehicle power distribution system, the power cable assembly may be shaped into the desired shape to enables easy integration for the desired application.

BRIEF DESCRIPTION OF THE DRAWINGS

The present invention is now described, by way of example with reference to the accompanying drawings, in which:

FIG. 3A provides a transverse cross-sectional view of the power cable assembly of FIG. 1;

FIG. 3B provides a transverse cross-sectional view of the power cable assembly of FIG. 2;

FIG. 4A provides a transverse cross-sectional view of an alternative arrangement of the power cable assembly of FIG. 1, according to an embodiment of the present disclosure;

FIG. 4B provides a transverse cross-sectional view of an alternative arrangement of a shielded power cable assembly of FIG. 2, according to an embodiment of the present disclosure;

FIGS. 10 and 10A show exemplified connection arrangements of a power distribution system, according to embodiments of the present disclosure; and FIGS. 11A to 11E show alternative arrangements of an electrical connector for attaching the power cable assembly to an electrical terminal of the power distribution system, according to embodiments of the present disclosure.

DETAILED DESCRIPTION

Figure 1:
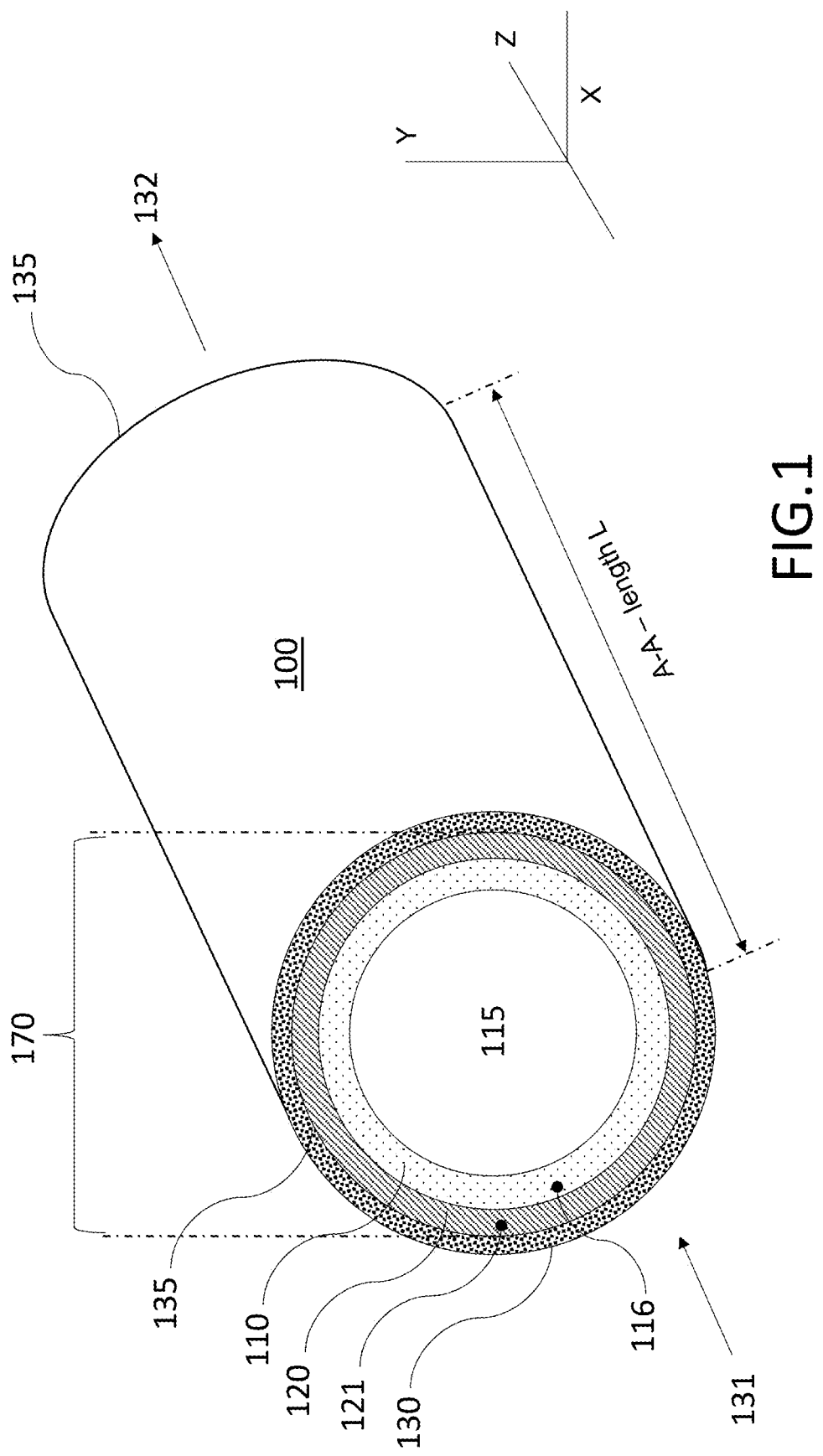
FIG. 1 is a perspective view of an exemplary power cable assembly according to an embodiment of the present disclosure.

The following discussion provides many exemplary embodiments of the inventive subject matter. Although each embodiment represents a single combination of inventive elements, the inventive subject matter is considered to include all possible combinations of the disclosed elements. Thus, if one embodiment includes elements A, B, and C, and a second embodiment includes elements B and D, then the inventive subject matter is also considered to include other remaining combinations of A, B, C, or D, even if not explicitly disclosed.

For simplicity and clarity of illustration, reference numerals may be repeated among the figures to indicate corresponding or analogous elements. Numerous details are set forth to provide an understanding of the examples described herein. The examples may be practised without these details. In other instances, well-known methods, procedures, and components are not described in detail to avoid obscuring the examples described. The description is not to be considered as limited to the scope of the examples described herein.

A power cable assembly 100 according to an embodiment of the present disclosure is described with reference to the figures and initially in particular with reference to FIGS. 1, 3A, 4A and 5. With reference to FIGS. 2, 3B, 4B and 6 an alternative power cable assembly 200 according to another embodiment of the present disclosure is described. The power cable assemblies 100, 200 include many features in common and common reference numbers have been used where appropriate.

Figure 2:
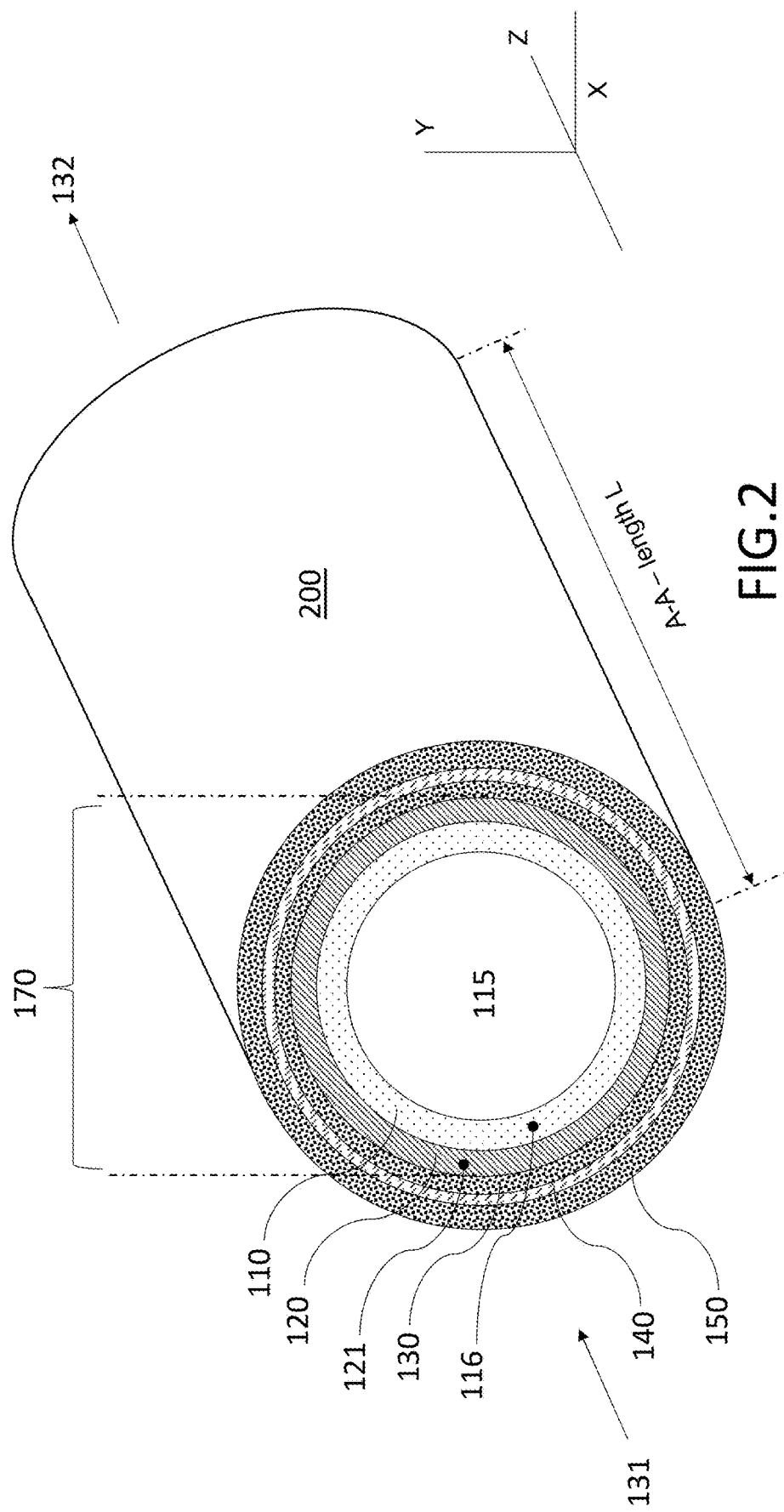
FIG. 2 is a perspective view of an exemplary shielded power cable assembly according to another embodiment of the present disclosure.
Figure 5:
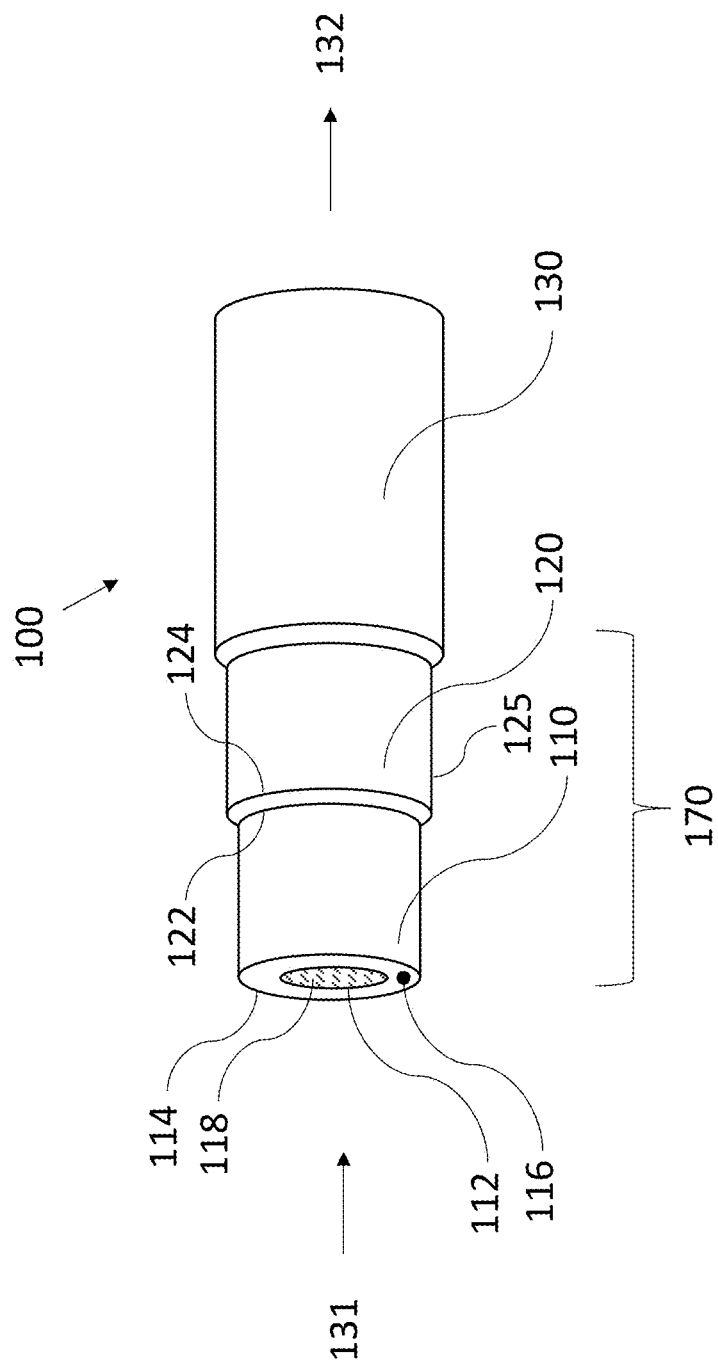
FIG. 5 is an enlarged break-out of the layers of the power cable assembly of FIGS. 1, 3A and 4A.
Figure 6:
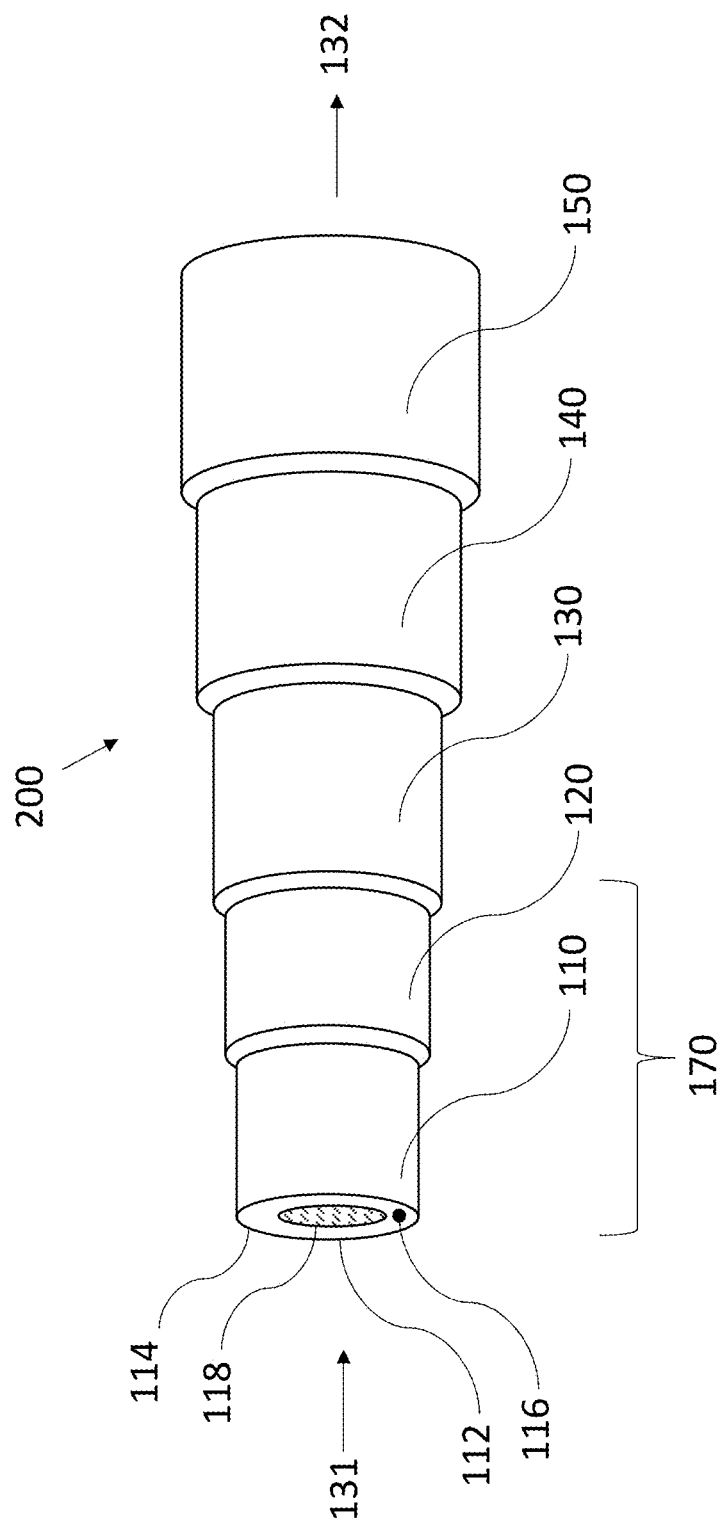
FIG. 6 is an enlarged break-out of the layers of the shielded power cable assembly of FIGS. 2, 3B and 4B.

The power cable assembly 100, 200 includes an electrical conductor 120. The power cable assembly 100, 200 has a longitudinal axis that extends in the z-direction as illustrated in FIGS. 1 and 2, between first and second ends thereof. The features of the power cable assembly 100, 200 are arranged about the longitudinal axis thereof.

The power cable assembly 100, 200 includes an electrical conductor 120. The electrical conductor 120 is both electrically conductive and thermally conductive. The electrical conductor 120 extends longitudinally between a first and a second contact surface 125 at opposing first and second ends 135 of the electrical conductor 120 and of the power cable assembly 100. The contact surfaces 125 are conducting surfaces. The electrical conductor 120 is configured for coupling via first and second connectors to respective electrical connection. For example, the electrical conductor 120 may be configured for coupling via a node of an electrical power supply at a first end and a battery at a second, respectively. The electrical conductor 120 is configured for connecting to a power distribution system.

Accordingly, the power cable assembly 100, 200 may for example be used in applications including for the delivery of power from a power supply to provide charging of a battery of a vehicle. The power cable assembly 100, 200 may be a flexible or an elastic cable assembly configured to be shaped into a desired form so as to provide a connection in a power distribution system.

FIGS. 1 to 6 show an exemplified implementation of a power cable assembly 100, 200 having the coolant inlet 131 and coolant outlet 132 at opposite ends of the power cable assembly 100, 200 according to embodiments of the present disclosure. In other arrangements, the coolant inlet 131 and coolant outlet 132 may be positioned at the same ends of the power cable assembly 100, 200, which would require that the cooling tube is folded, thereby creating a forward and return path for the coolant medium running parallel to one another.

The cooling tube 110, also referred to as cooling pipe, is provided such that it is at least partially surrounded by the electrical conductor 120, such that at least a portion of an external surface 114 of a thermally conductive wall 116 of the cooling tube 110 is provided in direct contact with a corresponding portion of the electrical conductor 120 over a heat exchange region. As a result, heat generated at the electrically conductive core 121 of the electrical conductor 120 is transferred over the heat exchange region to a coolant medium 115 circulating in an interior channel 118 defined by the thermally conductive wall 116 of the cooling tube 110 between the coolant inlet 131 and the coolant outlet 132. The coolant medium 115 is provided by a cooling system 300 arranged in fluid communication with the cooling tube 110. The coolant medium 115 may be a water-based coolant such as a water and glycol mixture. Equally, the coolant medium 115 may be a dielectric coolant such as purified water, oil-based coolant, or the like.

As shown in FIGS. 1 and 2, the cooling tube 110, in general, is configured to extend along the length of the electrical conductor 120 to ensure maximum heat dissipation. In the arrangement shown in FIGS. 1 to 6, the cooling tube 110 may be made from a polymer material having a wall thickness between 0.5 mm and 2.0 mm. The polymer material may be a flexible and/or elastic material, such as synthetic rubber, so as to be shaped to a desired form.

The electrical conductor 120 may be extruded over the cooling tube 110 by an extrusion process. The electrical conductor 120, may also be in the form of a busbar configured to be wrapped around the cooling tube 110. The electrical conductor has an internal surface 122 and external surface 124.

As shown in FIGS. 1 to 6, an insulating material, also referred to as an insulating layer 130, is provided around the power cable core 170. The insulating layer 130 may be arranged to compress the power cable core 170 to prevent relative movement of the electrical conductor 120 and cooling tube 110. The compressive force applied by the insulating layer 130 ensures that direct thermal contact is maintained between the external surface 114 of the thermally conductive wall 116 of the cooling tube 110 and the internal surface of the electrical conductor 120 thereby improving heat transfer between the electrical conductor 120 and the cooling tube 110.

The power cable assembly 200 of FIGS. 2, 3B, 4B, and 6 includes first and second insulating layers 130, 150 and a shielding layer 140 therebetween. In the arrangement shown in FIGS. 2, 3B, 4B, and 6, the power cable assembly 200 includes:

a first insulating layer 130 surrounding an external surface of the electrical conductor 120;

a shielding layer 140 surrounding the first insulating layer 130; and a second insulating layer 150 external to the shielding layer 140.

The first and/or second insulating layers 130, 150 may include an insulation material such as PA11, PA12 or XLPO or silicone. However, it will be appreciated that any suitable insulation material may be used for constructing the first and/or second insulating layers 130, 150.

The shielding layer 140 may for example be braid, pipe, or bundle shielding. However, it will be appreciated that any suitable alternative shielding may be used.

In the exemplary arrangements of FIGS. 1 to 6 the power cable assembly 100, 200 and the electrical conductor 120 have a generally cylindrical form and extend radially about their longitudinal axis. It will however be appreciated that electrical conductor 120 and/or the cooling tube 110 may be provided in other suitable forms, such as oval, rectangular, square, and the like.

The electrical conductor 120 and the cooling tube 110 of the exemplary power cable assemblies 100, 200 has a length L in the longitudinal direction. The cooling tube 110 has an internal surface 112 and external surface 114. The thermally conductive wall 116 of the cooling tube 110 that extends transversely or radially between the internal and external surfaces 112, 114 defines the thermally conductive body. The interior channel 118 of the cooling tube 110 has a diameter D inner Tube ($D_{in}$ Tube), which together with the radius, and the length of the cooling tube 110 defines the volume $V_{channel}$ of the interior channel 118 of the cooling tube 110, the volume of coolant that can be received therein, and the surface area of the interior channel 118. The cooling tube 110 has an inner radius and inner diameter $D_{in}$ Tube, and an outer radius and outer diameter D outer Tube ($D_{out}$ Tube). The diameters are shown in FIGS. 3A and 3B. In the exemplary arrangements shown in FIGS. 3A and 3B, the diameter is a radial distance determined as the difference between the outer radius and the inner radius of the cooling tube 110.

The conducting web or wall of the electrical conductor 120 that extends transversely or radially between the internal and external surfaces 122, 124 defines the electrically conducive core 121. The electrical conductor 120 has an inner radius and inner diameter D inner Conductor ($D_{in}$ Conductor), and an outer radius and outer diameter D outer Conductor ($D_{out}$ Conductor). The diameters are shown in FIGS. 3A and 3B. The conducting body has a depth $D_{out}$ Conductor—$D_{in}$ Conductor.

The depth or thickness of the thermally conductive wall 116 of the cooling tube 110, the inner and outer diameters and radii, together with the length L defines the volume $V_{tube}$ of the thermally conductive wall 116. The volume, form and dimensions of the cooling tube 110 and the interior channel 118 may be varied and are selected to provide the required levels of cooling for the power cable assembly. The area of the external surface 114 of the cooling tube 110 which defines the heat transfer surface, may also be varied and is selected to provide the required contact area between the dielectric coolant and the heat transfer surface. For example, the form, dimensions and volume of coolant relative to the volume of the cooling tube may be selected based on operational requirements, for example taking account of current and operating temperature requirements.

The electrical conductor 120 may completely surround the cooling tube 110 as illustrated in FIGS. 3A and 3B or may at least partially surround the cooling tube 110 as illustrated in FIGS. 4A and 4B having a gap 123 separating ends of the electrical conductor 120. The gap may be, for example but not limited to, an air-filled gap. The electrical conductor 120 is electrically conductive and heat conducting. The electrical conductor 120 is arranged such that at least a portion of an external surface 114 of the thermally conductive wall 116 is provided in direct contact with a corresponding portion of the electrical conductor 120 over a heat exchange region so as to transfer heat from the electrical conductor 120 to the coolant medium 115 circulating in the interior channel 118 of the cooling tube 110. In other words, the internal surface 122 of the electrical conductor 120 is arranged to be in direct contact direct contact with a corresponding portion of the external surface 114 of the cooling tube 110. In operation, heat that is generated in electrical conductor 120 as current passes through the electrically conducive core 121 is transferred via the cooling tube 110 to the coolant medium 115.

The electrical conductor 120 is made of an electrically conductive material such as copper, copper ETP (electrolytic tough-pitch copper), a copper alloy, aluminium, or an aluminium alloy. However, it will be appreciated that other suitable alternative materials may be used.

The provision of the coolant medium 115 in direct contact with the thermally conductive wall 116 of the cooling tube 110, which is in contact with the electrical conductor 120, provides for an improved heat transfer from the electrical conductor to the coolant. Therefore, the coolant medium 115 is thermally coupled to the electrically conductive heat transfer surface, for example the internal surface 122 of the conductor, to allow heat transfer from electrical conductor 120 to the coolant medium 115.

The cooling tube 110 defines a coolant pipe for the coolant medium 115. The coolant medium 115 is circulated though the interior channel 118 of cooling tube 110 in direct contact with the internal surface 112 of the cooling tube 110 between the first end opening and the second end opening. The cooling tube 110 is thermally conductive, and the coolant medium 115 is in thermal contact with the electrical conductor 120. More specifically, the coolant medium 115 is in thermal contact the heat conducting internal surface 122 of the electrical conductor 120.

Figure 7:
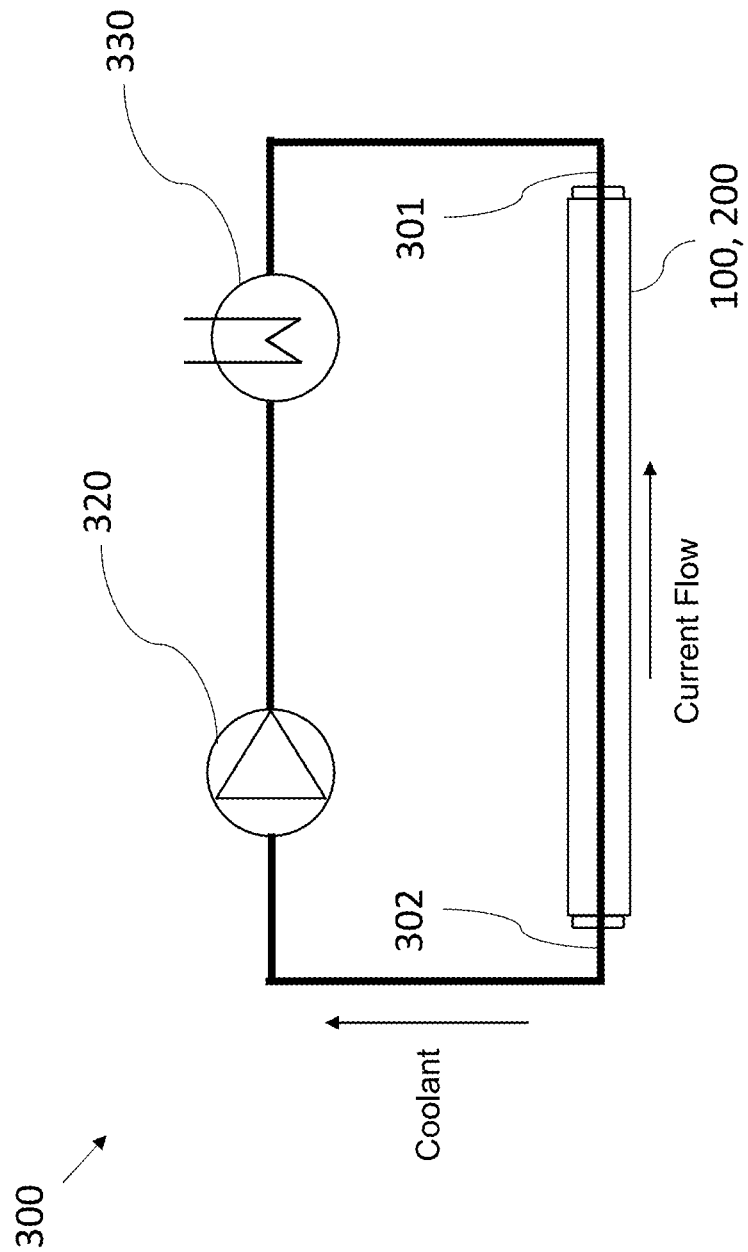
FIG. 7 is a diagram showing an exemplary power distribution system using a power cable assembly of FIGS. 1 to 6 and an integrated cooling system, according to embodiments of the present disclosure.
Figure 8:
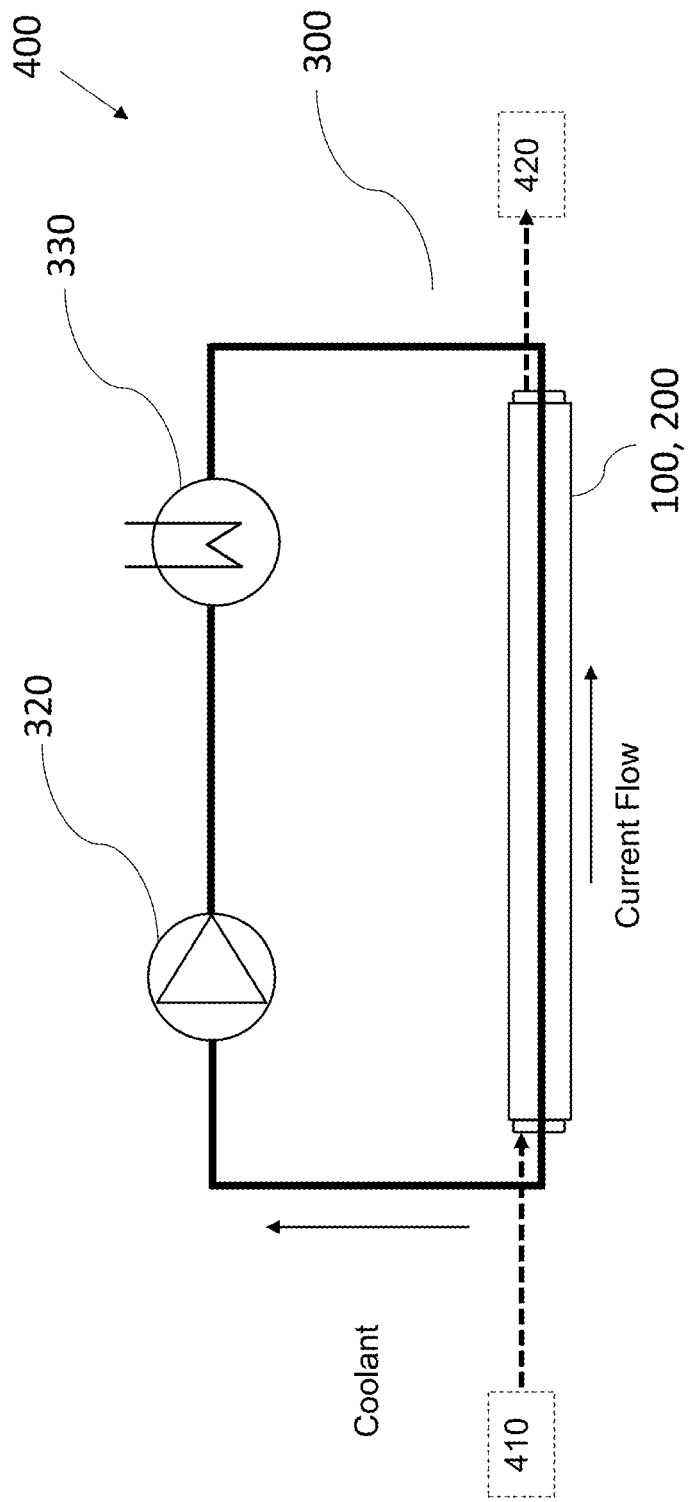
FIG. 8 is a diagram that illustrates an exemplary power distribution system with an integrated cooling system, according to embodiments of the present disclosure.

Referring to FIGS. 7 and 8, an exemplary power distribution system 400 including the power cable assembly 100, 200 and an integrated cooling system 300 is described. The power cable assembly 100, 200 is coupled to the cooling system 300.

The cooling system 300 of FIGS. 7 and 8 includes a pump 320 and a cooling unit 330. The power cable assembly 100, 200 is configured for connection to the cooling system 300. The coolant inlet 301 and the coolant outlet 302 are configured for connection using one or more connectors to the power cable assembly 100, 200.

In operation, the coolant medium 115, is circulated through the interior channel 118 of the cooling tube 110 of the power cable assembly 100, 200, between a coolant inlet 301 and a coolant outlet 302.

In the exemplary arrangement of FIG. 8, the coolant inlet 301 and coolant outlet 302 are located at opposite ends of the power cable assembly 100, 200. It will, however, be appreciated that in an alternative arrangement the coolant inlet 301 and the coolant outlet 302 may be located at the same end, the first end of the power cable assembly—in such an arrangement a U-bend or connector or other coolant flow return feature would be provided at the second end of the power cable assembly 100, 200.

The cooling system 300 includes a closed loop coolant circulation system. The coolant medium 115 is circulated by the pump 320 through the interior channel 118 of the cooling tube 110, between the coolant inlet 301 and the coolant outlet 302 and via the cooling unit 330. The coolant medium 115 is circulated in direct contact with the cooling tube 110. The cooling system 300 is configured for coupling to the coolant inlet 301 and the coolant outlet 302 using one or more connectors 525. The cooling system 300 may optionally be provided with a heat exchanger for extracting the heat from the circulated coolant medium.

FIG. 8 shows a power distribution system 400 with an integrated cooling system 300 and a power cable assembly 100, 200 are configured for connection between a first and second electrical nodes 410, 420 of a vehicle, such as a power supply and a battery of the vehicle.

The power distribution system 400 includes one or more connectors for connecting the power cable assembly 100, 200 to the inlet and outlets of the cooling system 300 and to the electrical terminals 540 of the power distribution system.

Figure 9:
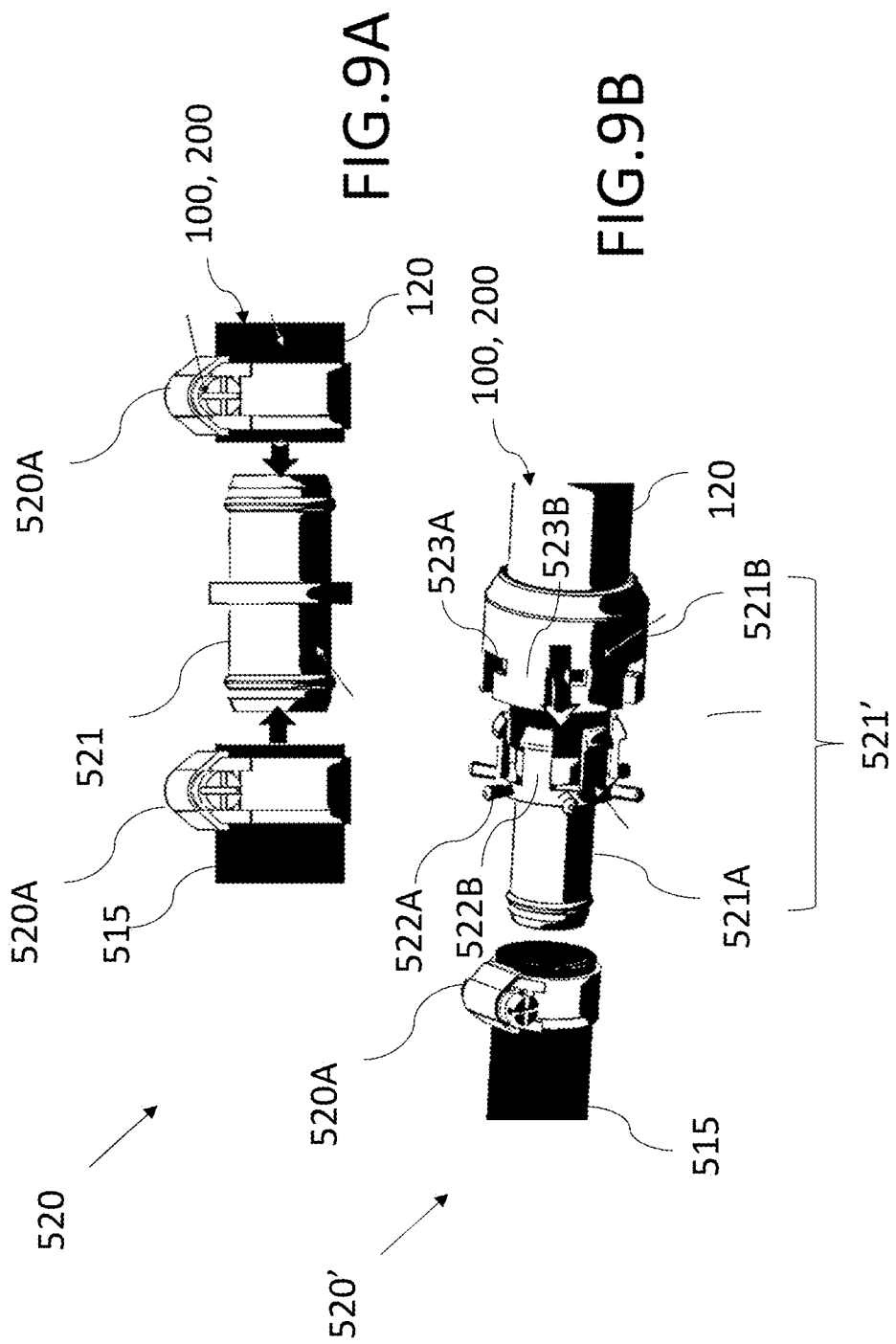
FIGS. 9A and 9B show exemplified arrangements of fluid attachment means for connecting the power cable assembly of FIGS. 1 to 6 to a cooling system, according to embodiments of the present disclosure.

The connection of the power cable assembly 100, 200 with the cooling system 300 may be effected via the fluid attachment means, also referred to as coolant medium connectors 520, 520', shown in FIGS. 9A and 9B. FIG. 9A shows a first arrangement of a coolant medium connector 520 including a fluid connector body 521 arranged to be inserted at one end to a coolant medium supply line 515, e.g. a hose of the cooling system 300 and the other end to the cooling tube 110 of the power cable assembly 100, 200. The fluid connector body 521 defines an internal channel for allowing the flow of the coolant medium 115 between the cooling system 300 and the power cable assembly 100, 200. Clamping means e.g., a hose clamp 520A in the form of adjustable worm drive clips or two-bolt clamps, may be used to secure the coolant medium connector 520 on the cooling tube 110 and the coolant medium supply line 515 of the cooling system 300.

An alternative and/or complementary arrangement of the coolant medium connector 520' is shown in FIG. 9B, whereby the fluid connector body 521' includes a first connector part 521A and a second complementary connector part 521B configured to interact with one another in an interlocking manner. The first connector part 521A is configured to be connected at a first end with the coolant medium supply line 515 of the cooling system 300, and at a second end with a complementary connecting portion of the second connector part 521B. The second end of the first connector part 521A includes fastening means including fastening elements 522A and clamping elements 522B configured to interact, with complementary fastening elements 523A and clamping elements 523B provided at the complementary connecting portion of the second connector part 521B to affect the fluid connection between the power cable assembly 100 and the cooling system 300. The second connector part 521B may be secured on the outer surface of the cooling tube 110, e.g., may be screwed or crimped on an outer surface of the cooling tube 110, thereby eliminating the need for using a hose clamp to secure the second connector part 521B to the power cable assembly 100, 200. As shown in FIG. 9B, the first end of the first connector part 521A of the fluid connector body 521' is configured to be inserted into the coolant medium supply line 515 of the cooling system 300 and secured therein with a hose clamp 520A, similarly to the embodiment shown in FIG. 9A. During assembly of the coolant medium connector 520', the second end of the first connector part 521A is configured to be inserted into a portion of the cooling tube extending through the complementary connecting portion of the second connector part 521B, causing the fastening elements 522A to engage with the complementary clamping elements 522B. In this exemplary arrangement, the complementary clamping elements 522B are configured to exert a biasing force on the fastening elements 522A, causing the clamping elements 522B to clamp onto an external surface portion of the cooling tube 110, to secure the first connector part 521A to the cooling tube 110. In order to maintaining the connection, the securing elements 523A, which may be in the form of pins, are configured to engage, via rotation of the first connector part 521A, with the complementary securing elements 523B, e.g., in the form of openings, to secure the first connector part 521A on the cooling tube 110. The assembly process can be reversed by unlocking the complementary securing elements 523A and 523B and pulling the second end of the first connector part 521A from the cooling tube 110. The fluid connector body 521', when assembled, defines an internal channel allowing the coolant medium 115 to flow between the power cable assembly 100, 200 and the cooling system 300.

Figure 10:
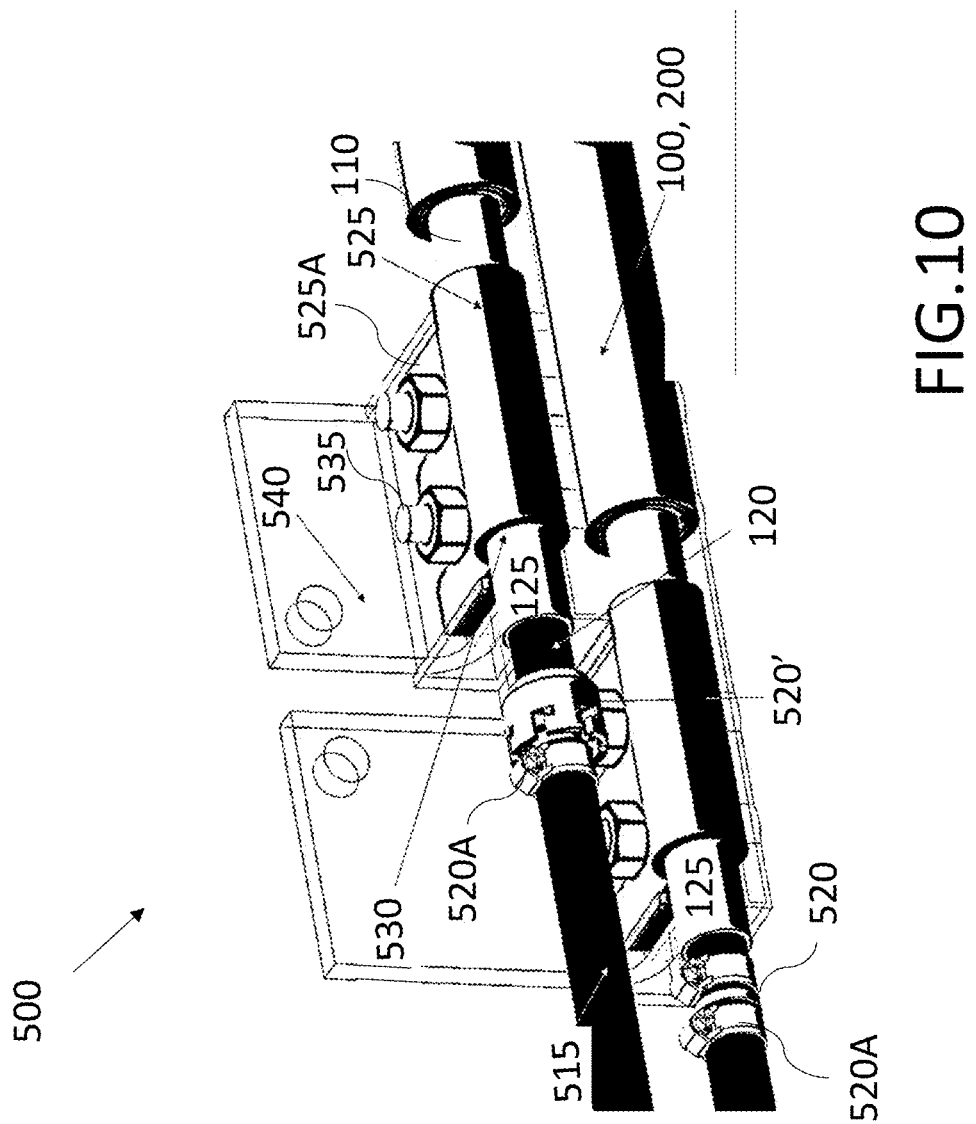

FIG. 10 shows an exemplified connection arrangement of the power distribution system 400 according to embodiments of the present disclosure. As shown, the power distribution system includes electrical connectors 525 for connecting the power cable assembly 100, 200 to the electrical terminals 540 of the power distribution system 400. The electrical connectors 525 are provided with a connector body including an electrical connection portion 530 and a coupling portion 525A.

In the embodiment shown in FIG. 10, the electrical connectors 525 are in the form of a clamp including a electrical connection portion 530 defining an opening for receiving the power cable core 170 of the power cable assembly 100, 200. As such, once the power cable core 170 is fitted through the opening of the electrical connection portion 530, the electrical connector 525 is provided in direct electrical contact with an electrical surface of the electrical conductor 120 of the power cable assembly 100, 200. The coupling portion 525A of the electrical connector is arranged to extend transversally with regard to a longitudinal axis of the power cable assembly 100. Fastening means 535, e.g., in the form of a nut and bolt, is provided such that the connector 525 is secured and electrically coupled, via the coupling portion 525A, to the electrical terminal 540 of the power distribution system 400. The tightening of the fastening means 535 affects the clamping operation of the electrical connector 525 around the power cable core 170. Although the fastening means 535 is depicted and described as particular nut and bolt arrangement for exemplary purposes, the present disclosure contemplates that the fastening means may define any suitable fastening means, according to particular needs so as to ensure electrical connection to electrical terminals 540 of the power distribution system. As shown in FIG. 10 the insulating layer 130 or insulating layers 130 and 150 in the case of the power cable assembly 200, has been stripped back so as to expose the contact surface 125 of the electrical conductor 120 to enable electrical contact with the electrical connector 525, as previously described. The connection of the power cable assembly 100, 200 with the cooling system 300 may be made by connecting a coolant medium supply line 515 of the cooling system 300 via the coolant medium connector 520 and/or 520' shown in FIGS. 9A and 9B, which may in the form of a hose, to the cooling tube 110 of the power cable assembly 100, 200.

FIG. 10A shows a further exemplified connection arrangement of the power distribution system 400 according to embodiments of the present disclosure. According to the connection arrangement of FIG. 10A, the coolant medium supply line 515 of the cooling system 300 may be connected directly to the power cable core 170 of the power cable assembly via a hose clamp 520A. Since the power cable core 170 is fitted into the coolant medium supply line 515, a dielectric coolant medium 115 is desired to ensure the electrical safety of the system.

FIGS. 11A and 11B shows an exemplified implementation of an alternative electrical connector 625, to the clamping type electrical connector 525 described with reference to FIGS. 10 and 10A. The electrical connector 625 includes a connector body including a connector portion 630, which is configured to be attached to the electrical conductor 120 of the power cable assembly 100, 200 by means of welding, gluing, or similar. The electrical connector portion 630 is shaped in the form of the power cable core 170 to ensure maximum surface contact with the external surface of the electrical conductor 120. The electrical connector 625 includes, similarly to the electrical connector 525, a coupling portion 625A for securing and electrically connecting the power cable assembly 100, 200 to an electrical terminal 540 of the power distribution system 400.

Figure 11C:
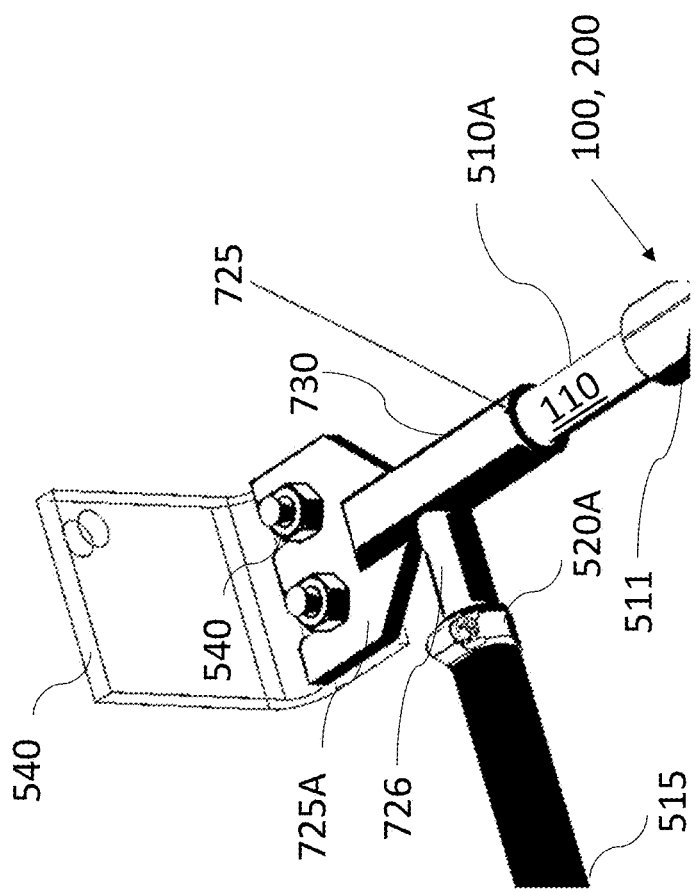

FIG. 11C shows another exemplified implementation of an electrical connector 725 according to embodiments of the present disclosure. In this arrangement, the electrical connector 725 includes, in addition to the electrical connector portion 730 and the coupling portion 725A, a coolant medium connection portion 726, which is configured to be directly connected with a coolant medium supply line 515 of the cooling system 300. The connection between the coolant medium connection portion 726 and the coolant medium supply line 515 may be affected by means of a hose clamp 520A or any one of the coolant medium connectors 520 or 520' shown in FIGS. 9A and 9B.

In general, the coupling portion 525A or 625A of the electrical connectors 525 or 625 may have a substantially flat profile provided with one or more openings 526 or 626 for receiving fastening means 535 for coupling to an electrical terminal 540 of a power distribution system 500, as shown in FIGS. 11D and 11E.

While the power distribution system 400 and power cable assemblies 100 and 200 of the present disclosure have been described in terms of the preferred embodiments thereof, it is not intended to be so limited, but rather only to the extent set forth in the claims that follow.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any order of arrangement, order of operations, direction or orientation unless stated otherwise.

The invention claimed is:

1. A power cable assembly comprising:
   a power cable core including:
   a longitudinally extending cooling tube comprising a thermally conductive wall defining an interior channel for circulating a coolant medium between a coolant inlet and a coolant outlet of the cooling tube;
   a longitudinally extending electrical conductor configured to be coupled to respective electrical connections of a power distribution system via first and second electrical connectors, wherein the electrical conductor is extruded over the cooling tube and wherein the electrical conductor is in the form of a busbar configured to be wrapped around the cooling tube; and
   a first insulating layer surrounding the power cable core, wherein the electrical conductor is arranged to completely surround the cooling tube such that at least a portion of an external surface of the thermally conductive wall is provided in direct contact with a corresponding portion of the electrical conductor over a heat exchange region so as to transfer heat from the electrical conductor to the coolant medium circulating in the interior channel of the cooling tube.

2. The power cable assembly of claim 1, wherein the electrical conductor is comprised of a metal material.

3. The power cable assembly of claim 2, wherein the metal material comprises one or more of the following:
   (i) copper, copper ETP, and/or a copper alloy; and
   (ii) aluminum, and/or an aluminum alloy.

4. The power cable assembly of claim 1, wherein the cooling tube is made from a polymer material.

5. The power cable assembly of claim 1, wherein a thickness of the thermally conductive wall of the cooling tube is between 0.5 mm and 2.0 mm.

6. The power cable assembly of claim 1, wherein the cooling tube has a tubular form.

7. The power cable assembly of claim 1, wherein the cooling tube has a cylindrical form.

8. The power cable assembly of claim 1, further comprising:
   (i) a shielding layer surrounding the first insulating layer; and
   (ii) a second insulating layer external to the shielding layer.

9. A cooling system comprising:
   the power cable assembly of claim 1;
   a circulation pump for circulating the coolant medium between the coolant inlet and the coolant outlet;
   a cooling unit; and
   one or more coolant medium connectors for connecting the coolant inlet and the coolant outlet to the cooling system, wherein the coolant medium is circulated, via the cooling system, through the interior channel of the cooling tube between the coolant inlet and the coolant outlet.

10. The cooling system of claim 9, wherein the coolant medium comprises a water-based coolant.

11. The cooling system of claim 9, wherein the coolant medium comprises a dielectric coolant.

12. The cooling system of claim 9, wherein the coolant inlet and coolant outlet are arranged at opposite ends of the electrical conductor.

13. The cooling system of claim 9, wherein the coolant inlet and coolant outlet are arranged at the same end of the power cable assembly.

14. The cooling system of claim 9, wherein the first and second electrical connectors each comprise:
   a connector body comprising:
   a connector portion adapted to contact an end contact surface of the electrical conductor; and
   a coupling portion adapted for an electrical connection to a respective electrical connection of the power distribution system.

* * * * *